United States Patent [19]

Buchholz et al.

[11] Patent Number: 5,307,348
[45] Date of Patent: * Apr. 26, 1994

[54] SCHEDULING IN A COMMUNICATION SYSTEM

[75] Inventors: Dale R. Buchholz, Palatine; Brian J. Wesselman, Wood Dale; Michael P. Nolan, Lake Zurich, all of Ill.

[73] Assignee: Motorola, Inc., Schaumburg, Ill.

[*] Notice: The portion of the term of this patent subsequent to Aug. 24, 2000 has been disclaimed.

[21] Appl. No.: 608,867

[22] Filed: Nov. 5, 1990

[51] Int. Cl.$^5$ .............................................. H04J 3/26
[52] U.S. Cl. ................................. 370/85.2; 370/94.1; 370/95.3
[58] Field of Search .................... 370/85.1, 85.3, 95.3, 370/109, 94.1, 85.2, 85.7, 95.1, 104.1

[56] References Cited

U.S. PATENT DOCUMENTS

| | | | |
|---|---|---|---|
| 4,161,786 | 7/1979 | Hopkins et al. | 370/85.2 |
| 4,491,947 | 1/1985 | Frank | 370/104.1 |
| 4,688,212 | 8/1987 | MacGinitie et al. | 370/58.1 |
| 4,745,599 | 5/1988 | Raychaudhuri | 370/94.1 |
| 4,759,016 | 7/1988 | Otsuka | 370/76 |
| 4,817,089 | 3/1989 | Paneth et al. | 370/109 |
| 4,839,892 | 6/1989 | Sasaki | 370/95.1 |
| 4,852,089 | 7/1989 | Berry et al. | 370/95.1 |
| 4,868,811 | 9/1989 | Suzuki | 371/50 |
| 5,003,534 | 3/1991 | Gerhardt et al. | 370/94.1 |
| 5,012,469 | 4/1991 | Sardana | 370/95.1 |

Primary Examiner—Douglas W. Olms
Assistant Examiner—Melvin Marcelo
Attorney, Agent, or Firm—Richard A. Sonnentag

[57] ABSTRACT

A CM (105) receives requests for data transfer from a series of UMs (101-103) and from an EM (104). The requests contain the UM (101-103) or EM (104) address and the size of the data packet to be transferred. The CM (105) processes the requests on a FIFO basis, stores the requests in a queue and schedules either a small data channel (415) or a large data channel (420), depending on the packet size to be transferred, an acknowledgement channel (425) and also the corresponding number of required timeslots. The CM (105) picks the first request off the queue and sends a grant to the particular UM (101-103) or EM (104) which receive the grant and immediately access either the assigned small or large data channels (415, 420) in the required number of timeslots and the acknowledgement channel (425).

38 Claims, 6 Drawing Sheets

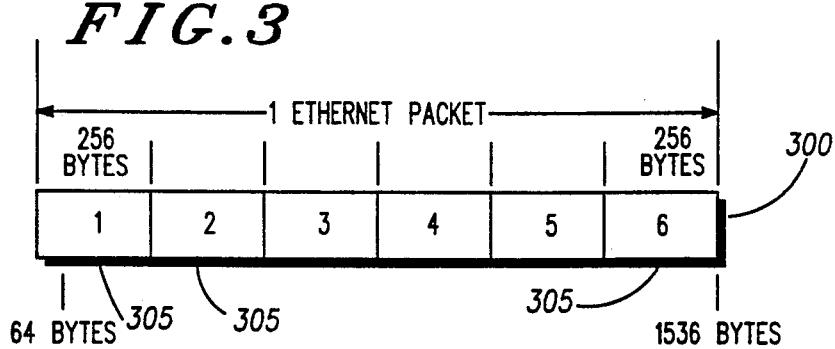
FIG.3
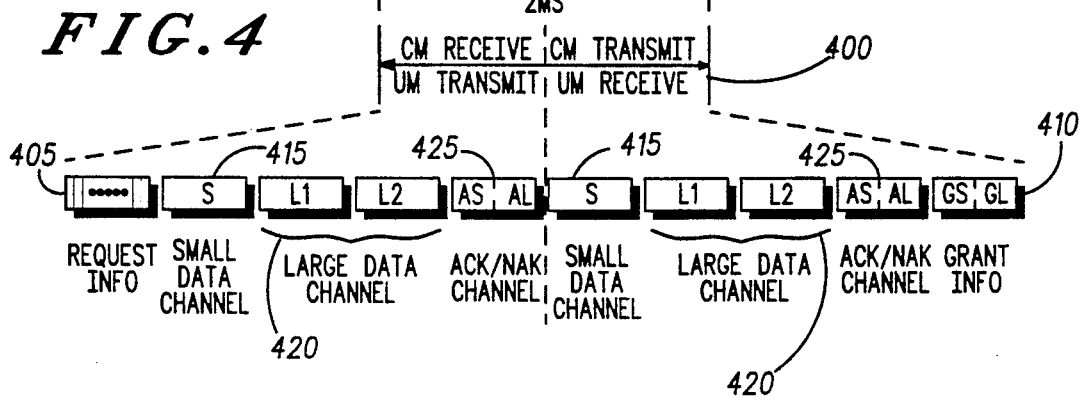
FIG.4
FIG.5
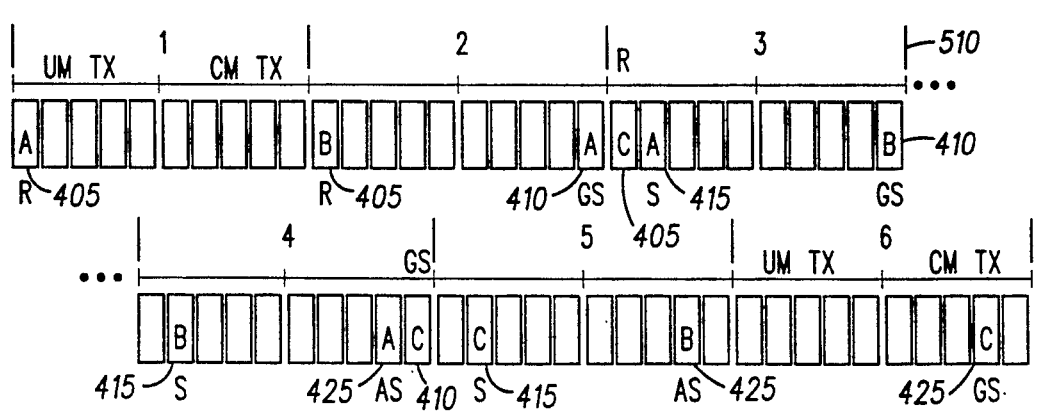

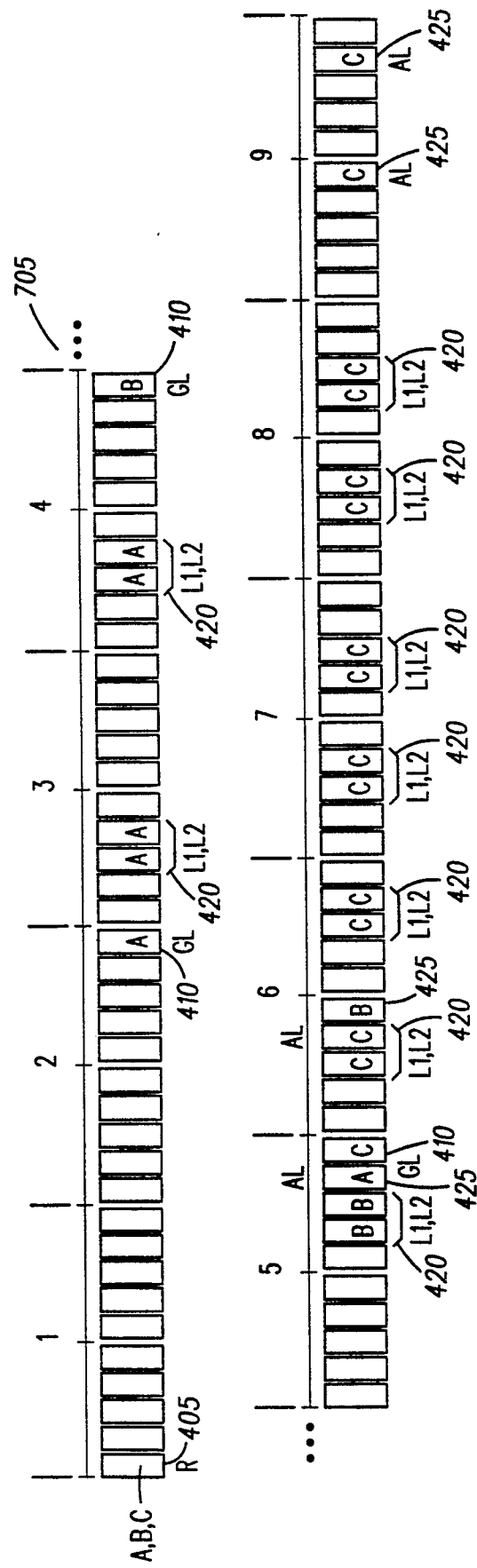

SCHEDULING IN A COMMUNICATION SYSTEM

FIELD OF THE INVENTION

The invention generally relates to information systems in which data is transmitted by packets, and more specifically, to structuring of packets in TDM frames for data transmission. Reference is made to U.S. patent application Ser. No. 07/608,952, "Channel Access Control in a Communication System" in behalf Buchholz et al., filed on the same date herewith, containing related subject matter and assigned to the assignee of the present invention, now U.S. Pat. No. 5,239,545.

BACKGROUND OF THE INVENTION

Generally, data transmission systems convey information in the form of packets from an originator to a specified addressee. Typical systems, such as token ring and polling systems, query the specified addressee to determine if the addressee has information to be transmitted. These types of systems, however, are not without their limitations. The token ring data transmission system, for example, passes a token or message to all users around a ring to determine if the users have data to be transmitted. Each user on the ring receives the message, decodes it, and transmits data if necessary. Polling systems are similar in that a periodic poll is sent to all users to determine if data transmission is required. The users again decode the poll and transmit data if necessary. Both of these data transmission systems limit system throughput by introducing unnecessary data on the bus or lines carrying the data. The systems also tie up the users when transmission may not be necessary.

Data can also be transferred in time-division multiplexed (TDM) systems, such as satellite communication systems. Satellite systems generally use a satellite acting as a relay, receiving and transmitting requests from land-based ground stations. When the ground stations require data transmission, they request access to a TDM time-slot. Depending on the prioritizing mechanism, the requests are processed and the TDM time-slot issued. The system, however, is limited in the fact that the satellite system acts on a distributed queue management basis, assigning all necessary time-slots to the requesting ground stations at the start of a TDM frame. This requires that all ground stations receive the request information and monitor when other ground stations transmit, and when their particular transmit time arrives, access the system. If one of the requesting ground stations does not receive any of the requests sent by other ground stations, it has the possibility of becoming out of synchronization with the rest of the system. If this happens, the ground station must first re-synchronize to the system and repeat the requesting process. The process of re-synchronization and repeating the requesting process can be very time consuming and result in perceptible user delay.

The systems mentioned may also perform scheduling of channels, but not on a frame-by-frame basis. The satellite system, for example, is required to keep track of all the ground stations that have requested access and can thus schedule the ground station access in time. If, as mentioned above, a ground station becomes out of synchronization with the system, the scheduled timeslots in the corresponding frames go un-used since the ground station is not able to gain access. This method of scheduling yields an inefficient use of the TDM frame timeslots when ground stations lose synchronization with the system.

Thus, a need exists for a data transmission system which can schedule timeslots in a TDM system on a frame-by-frame basis and also look ahead in time and pre-schedule data channels to reduce processing time and aid in transmission efficiency.

SUMMARY OF THE INVENTION

A control module schedules access to a plurality of data channels in a radio frequency (RF) time-division multiple access (TDMA) communication system. The control module is coupled to a plurality of user modules over a RF link, wherein at least first and second user modules have sent a first and second access request command, respectively, to the control module to request access to at least one data channel. The control module provides repetitive TDMA timeslots including at least a first TDMA timeslot and at least one data channel disposed in at least the first TDMA timeslot. The control module receives at least the first and second access request command in at least the first TDMA timeslot and determines which of at least the first access request command and second access request command was received first. The control, responsive to the determining, schedules access to at least one data channel in at least the first TDMA timeslot.

BRIEF DESCRIPTION OF THE DRAWINGS

FIG. 3 depicts an Ethernet LAN system packet subdivided into 256-byte fragments.

FIG. 4 generally depicts half-duplex TDM frame structure in accordance with the invention.

FIG. 5 depicts a small data channel scheduling matrix and the subsequent timing information in accordance with the invention.

FIG. 7 depicts a system scheduling matrix and the subsequent timing information in accordance with the invention.

DETAILED DESCRIPTION OF A PREFERRED EMBODIMENT

Figure 1:
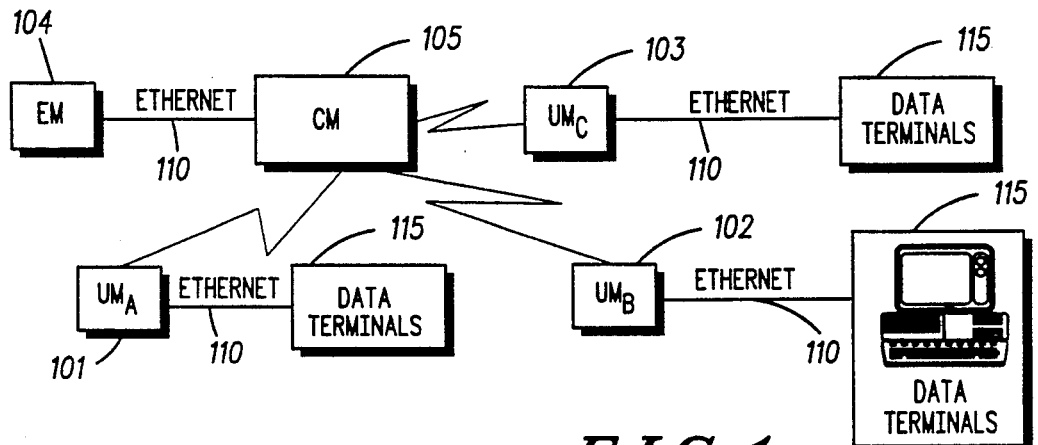
FIG. 1 generally depicts a data communication system which may incorporate the present invention.

FIG. 1 generally depicts a RF data communication system. Generally, a user module (UM) or modules 101–103 transmit a request to a control module (CM) 105 over an RF link. The request that is transmitted includes the source UM address, the destination and the data packet size that is required for the particular transmission. The CM 105 receives the requests from the UMs 101–103 on a first in/first out (FIFO) basis. The CM 105 processes the requests from the UMs 101–103 and accesses the timeslots necessary to transmit the particular packet size. A grant is then sent from the CM 105 to the source UM whose request was received first. The source UM receives the grant and in the next TDM frame, accesses the required timeslots.

FIG. 1 also depicts the UMs 101-103 and the CM 105 connected to an Ethernet local area network (LAN) system 110. The CM 105, through the Ethernet LAN system 110, may typically be connected to an external module (EM) 104 which may include other CMs, LANs, metropolitan area networks (MANs) and wide area networks (WANs) including public switched telephone networks (PSTNs) (not shown). The UMs, through the Ethernet LAN system 110, are typically connected to data terminals 115, which are personal computers in the preferred embodiment. The data terminals 115 serve as origination points for data to be sent by the UMs 101-103 to the CM 105. The UMs 101-103 generate transmission requests when there is data to be sent. The Ethernet LAN system 110 serves as an interface between the data terminals 115 and the UMs 101-103.

Figure 2:
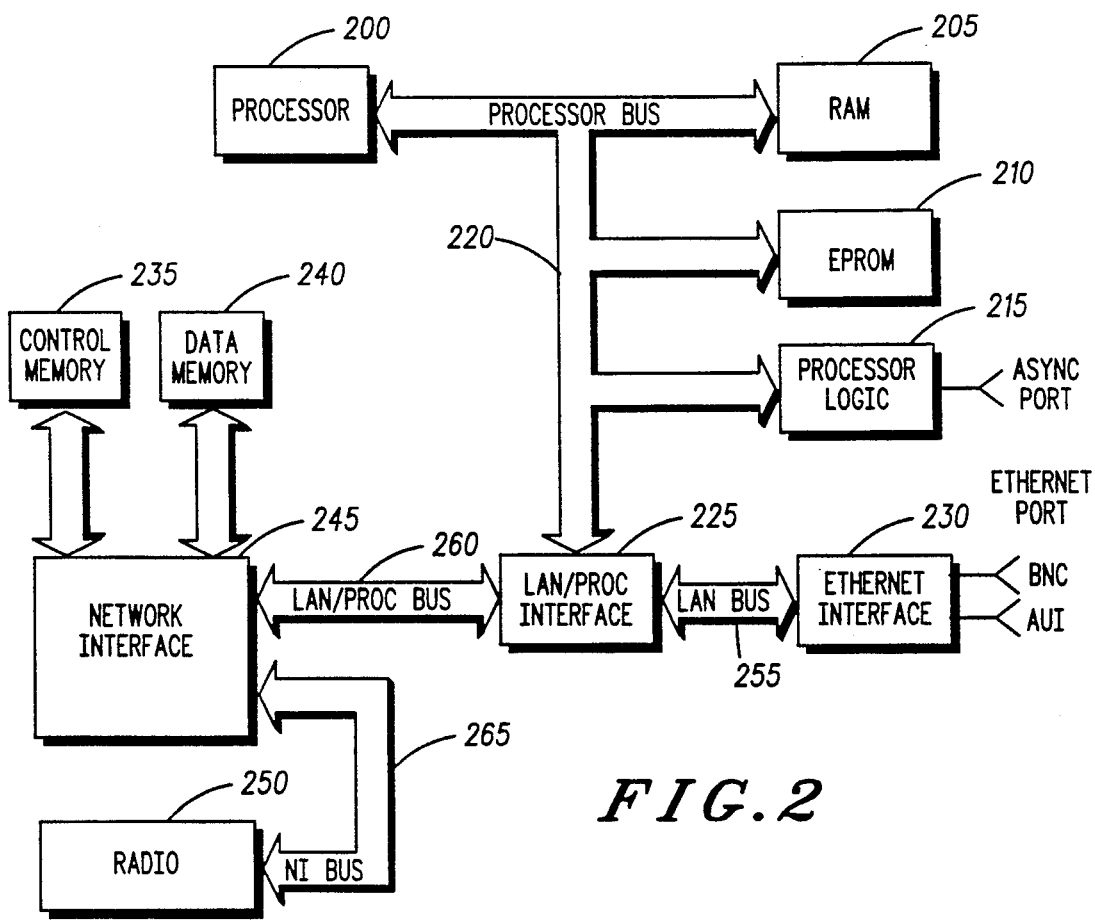
FIG. 2 generally illustrates the user module and control module in the above mentioned data communication system.

FIG. 2 is a block diagram of the UMs 101-103 and the CM 105. A processor 200, which is a Motorola 68000 in the preferred embodiment, is connected to a RAM 205, an EPROM 210 and additional processor logic 215 through a processor bus 220. The EPROM, which is a Seeq Inc FLASH ™ NQ48F512K-300 in the preferred embodiment, is a non-volatile storage media that is used to store system software. The software is copied to the RAM 205 at startup to provide faster execution time. The EPROM 210 is reprogrammable via the asynchronous port on the UMs 101-103. An Ethernet interface 230, which is made up of an AMD Inc LANCE ™ chip set and a National Inc coaxial transceiver in the preferred embodiment, provides interface to the Ethernet LAN system 110. A LAN bus 255 transmits data from the Ethernet interface 230 to a LAN/processor interface 225. The LAN/processor interface 225 is coupled to a network interface 245 which has control memory 235 and data memory 240. The network interface 245 is a fast packet switch which provides information transfer among the processor 200, Ethernet interface 230 and a radio 250 via time-division, fast packet switching technology. The information is transferred among these devices via the data memory 240. The control memory 235 is used to control the operation of the network interface 245 and hence the location of data stored in the data memory 240.

FIG. 3 depicts an Ethernet packet 300. Ethernet packets 300 may vary in size between 64 and 1536 bytes in length and the error characteristic in the Ethernet LAN system 110 is $10^{-8}$. The RF data communication system depicted in FIG. 1 has an expected error characteristic of $10^{-5}$, requiring the use of RF packets (fragments) in the 256-byte range. Ethernet packets 300 larger than this size need to be fragmented in order to meet the RF data communication system capability. FIG. 3 depicts a standard Ethernet packet 300 subdivided into six separate 256-byte fragments 305.

Typical traffic on the Ethernet LAN system 110 can generally be classified by packet size. For example, a small packet might be less than 128-bytes and is sufficient to accommodate higher layer protocol acknowledgments/negative acknowledgments, heart beat timers, terminal servers, etc. Medium packets are typically sized from 512 to 600 bytes and best suited for file transfers and data base transactions. Large packets typically range from 1024 to 1100 bytes and are also used for file transfers and data base transactions. Assuming 256-byte fragments are used over the RF link to transfer Ethernet packets 300, a small pocket will easily fit into one fragment; most medium packets will require three fragments and most large packets will require five fragments. The maximum Ethernet packet 300 size of 1536-bytes requires six fragments.

FIG. 4 generally depicts 256-byte fragment accessing in accordance with the invention. The system uses time-division multiplexing (TDM) on a RF carrier to exchange information from the CM 105 to the corresponding UMs 101-103. One RF TDM frame 400, which has a duration of two milliseconds in the preferred embodiment, is divided to accommodate the half-duplex system. During the first half of the RF TDM frame 400, the CM 105 receives data transmitted by the UMs 101-103. In the second half of the RF TDM frame 400, the roles are reversed and the UMs 101-103 receive data transmitted by the CM 105. The first half of the RF TDM frame 400 comprises a 660 byte request timeslot 405 comprised of 12 55-byte slots and three 256-byte fragments 305. In the preferred embodiment, each UM 101-103 can transmit up to three requests per RF TDM frame 400 and the CM 105 can receive up to twelve requests per RF TDM frame 400. One 256-byte fragment 305 comprises a small data channel 415 while the other two 256-byte fragments 305 comprise one large data channel 420. The first half of the RF TDM frame 400 also consists of an acknowledgement/negative acknowledgement channel 425 which is actually two separate channels, one for the large data channel and one for the small data channel. The second half of the RF TDM frame 400 also consists of three 256-byte fragments 305 (again, one 256-byte fragment 305 comprising a small data channel 415 and two 256-byte fragments 305 comprising a large data channel 420) and a acknowledgement/negative acknowledgement channel 425 but the request timeslot 405 is replaced with a grant timeslot 410. The grant timeslot actually contains two separate grants; one for the small data channel and one for the large data channel. In the first half of the RF TDM frame 400, the request timeslot 405 is first in time followed by the small data channel 415 and then the large data channel 420. In the second half of the RF TDM frame, the small data channel 415 is first in time followed by the large data channel 420 and finally the grant timeslot 410.

Accessing of the fragments in the required data channel is best explained by example. FIG. 5 depicts a small data channel access matrix 500 and the corresponding timing diagram 510 in accordance with the invention. To initiate a data transfer, the UMs 101-103 transmit a request to the CM 105. A request contains information such as the address of the source UM and the number of fragments (depending on Ethernet packet 300 size) required for transmission. The fact that the UMs 101-103 notify the CM 105 in advance as to the number of fragments required for transmission allows the CM 105 to grant either a small data channel or a large data channel to the requesting UMs 101-103. Again, FIG. 5 only depicts UMs 101-103 that require a data transfer of less than 256-bytes (only one fragment 305), thus only a small data channel 415 is required. Significant to the example is that the UMs 101-103 may all request access to the small data channel 415 during the same RF TDM frame 400, but the CM 105 only processes the requests on a FIFO basis. Continuing, if the CM 105 receives a first request in the request timeslot 405 from $UM_A$ 101 in RF TDM frame #1, the CM 105 sends a small data channel grant back to $UM_A$ 101 in the grant timeslot 410 in RF TDM frame #2. $UM_A$ 101, upon receiving the grant, will access the small data channel 415 in RF TDM frame #3. After UM$_A$ 101 has completed accessing the small data channel, the CM 105 transmits an acknowledgment to UM$_A$ 101 in the ACK channel 425 of RF TDM frame #4. UM$_B$ 102 also requests access to the small data channel 415 and for this example, the request is sent in request timeslot 405 of RF TDM frame #2. A small data channel grant is sent back from the CM 105 to UM$_B$ 102 in the grant timeslot 410 of RF TDM frame #3. Again, UM$_B$ 102 accesses the small data channel 415 in the ensuing RF TDM frame time, #4, upon receiving the grant in RF TDM frame #3. The CM 105 accesses the ACK channel 425 and transmits an acknowledgement to UM$_B$ 102 in RF TDM frame #5. Finally, UM$_C$ 103 sends a request in the request timeslot 405 of RF TDM frame #3, receives a small data channel grant in the grant timeslot 410 of RF TDM frame #4 and accesses the small data channel 415 in RF TDM frame #5. The CM 105 accesses the ACK channel 425 and transmits an acknowledgement to UM$_C$ 103 in RF TDM frame #6.

Figure 6:
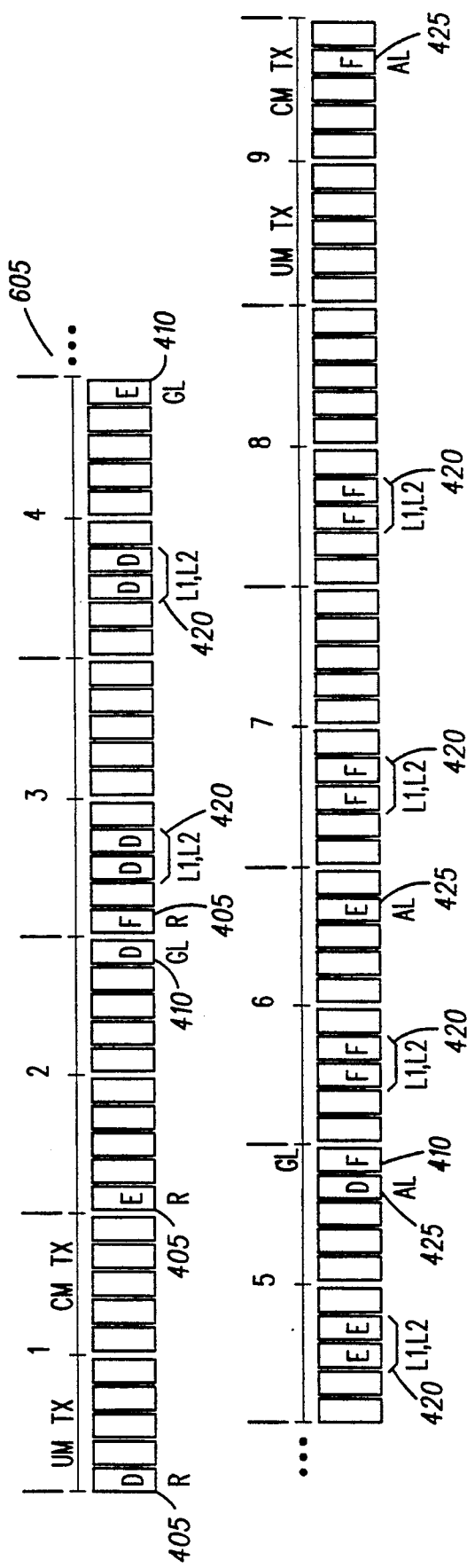
FIG. 6 depicts a large data channel scheduling matrix and the subsequent timing information in accordance with the invention.

For UMs requiring greater than 256-bytes (greater than one fragment) for data transmission, the large data channel 420 is accessed. FIG. 6 depicts a large data channel access matrix 600 and the corresponding timing information 605 in accordance with the invention. Again, accessing of the large data channel is best explained by an example. UM$_D$, UM$_E$, and UM$_F$ (not shown) are coupled to the CM 105 via the RF link. In accessing of the large data channel 420, each UM, in its request to the CM 105, requests two fragments, four fragments or six fragments depending on the size of the Ethernet packet 300. In this example, UM$_D$ requires four of the fragments 305, UM$_E$ requires two of the fragments 305 and UM$_F$ requires six of the fragments 305. This corresponds to UM$_D$ requiring greater than 512 bytes but less than 1024 bytes, UM$_E$ requiring greater than 256-bytes but less than 512 bytes and UM$_F$ requiring greater than 1024 bytes. Remembering that the CM 105 processes requests from the UMs on a FIFO basis thus, in this example, it can be assumed that the request from UM$_D$ is received first, the request from UM$_E$ received second and, finally, the request from UM$_F$ received third. Returning to FIG. 6, UM$_D$ initiates a transfer of its four fragments by sending an access request in the request timeslot 405 of TDM frame #1. The CM 105 schedules the four fragments into large data channels 420 in two consecutive RF TDM frames 400 and, since UM$_D$s request is received first, immediately sends a large data channel grant in the grant timeslot 410 of RF TDM frame #2. When UM$_D$ receives the grant, it immediately transmits two fragments 305 in the large data channel 420 of RF TDM frame #3 and the remaining two fragments 305 in the large data channel 420 of RF TDM frame #4. The CM 105 accesses the ACK channel 425 and transmits an acknowledgement to UM$_D$ in RF TDM frame #5. Referring to the large data channel access matrix 600, it is seen that UM$_E$ sent an access request in the request timeslot 405 of RF TDM frame #2. Since the CM 105 had previously scheduled the four fragments for UM$_D$, the CM 105 knows that the next available large data channel 420 occurs in RF TDM frame #5 and will thus skip RF TDM frame #3 and send a large data channel grant in the grant timeslot 410 of RF TDM frame #4. When UM$_E$ receives the grant, it immediately transmits its two fragment 305 in the large data channel 420 of RF TDM frame #5. The CM 105 again accesses the ACK channel 425 and transmits an acknowledgement to UM$_E$ in the following RF TDM frame, #6. Again referring to the large data channel access matrix 600, it is seen that UM$_F$ sent an access request in the request timeslot 405 of RF TDM frame #3 to the CM 105. The CM 105, having scheduled the request for UM$_E$, knows that the next available large data channel 420 will be in RF TDM frame #6 and will thus send a large data channel grant in the grant timeslot 410 of RF TDM frame #5. UM$_F$, upon receiving the grant, will transmit two fragments 305 in the large data channel 420 of RF TDM frame #6, another two fragments 305 in the large data channel of RF TDM frame #7 and its final two fragments 305 in the large data channel 420 of RF TDM frame #8. The CM 105 will access the ACK channel 425 and transmit an acknowledgement to UM$_F$ in RF TDM frame #9. If still another UM were to require access to the large data channel 420, it would not receive a grant until RF TDM frame #8 since the next available large data channel 420 occurs in RF TDM frame #9.

The RF data communication system of FIG. 1 can also transfer data originating from the CM 105 and relay data from one UM 101–103 to another. FIG. 7 depicts a system access matrix 700 and the subsequent timing information 705 of these types of system access. For example, referring to FIG. 1, assume UM$_A$ 101 requires access to the large data channel 420 and uses four fragments, the CM 105 needs to transfer two fragments to UM$_B$ 102, and UM$_C$ 103 needs to transfer six fragments to UM$_A$ 101. The system allows all access requests to be received in the request timeslot 405 of RF TDM frame #1, and as can be seen, the access request for UM$_A$ 101 was received first, the request for UM$_B$ 102 second and the request for UM$_C$ 103 third. UM$_A$ receives an access grant in the grant timeslot 410 of RF TDM frame #2 and immediately accesses the system in the large data channel 420 of RF TDM frames #3 and #4. The CM 105, in ACK channel 425, transmits an acknowledgement to UM$_A$ 101 in RF TDM frame #5. During RF TDM frame #4, a grant is issued to the CM 105 to transfer its two fragments to UM$_B$ 102 in the grant timeslot 410. In this case, the CM 105 accesses the large data channel 420 in RF TDM frame #5 in the CM TX half of the RF TDM frame 400 and UM$_B$ 102 accesses the ACK channel 425 to verify transmission in the following RF TDM frame, #6. During RF TDM frame #5, a grant is also being sent during the grant timeslot 410 to UM$_C$ 103. When the grant is received, UM$_C$ 103 immediately accesses the large data channel 420 during the UM TX half of RF TDM frame #6, transferring two of its six fragments to the CM 105. The CM 105 relays the two fragments to UM$_A$ 101 in the large data channel 420 during the CM TX half of RF TDM frame #6. This process is repeated in RF TDM frame #7 and #8 until all six fragments are transferred from UM$_C$ 103 to UM$_A$ 101. When UM$_C$ 103 completes the transmission of all six of its fragments, the CM 105 accesses the ACK channel 425 and transmits an acknowledgement to UM$_C$ 103 in RF TDM frame #9. When the CM 105 completes the relay of fragments to UM$_A$ 101, it accesses the ACK channel 425 during the CM transmit half of the RF TDM frame 400 and transmits an acknowledgement to UM$_A$ 101 in RF TDM frame #9.

Figure 8A:
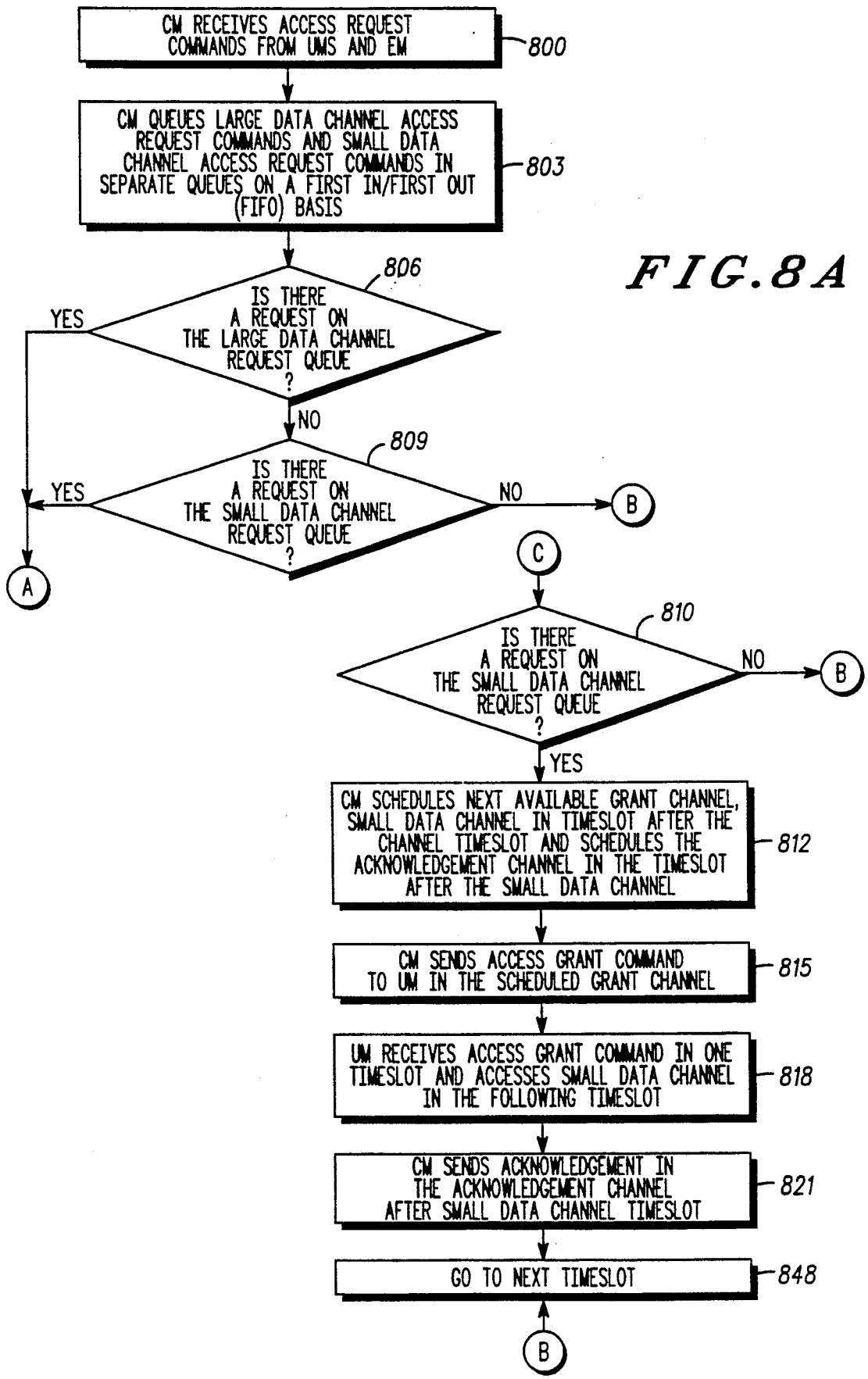
FIG. 8 comprising 8A and 8B is a flow diagram illustrating the steps of channel scheduling in accordance with the invention.
Figure 8B:
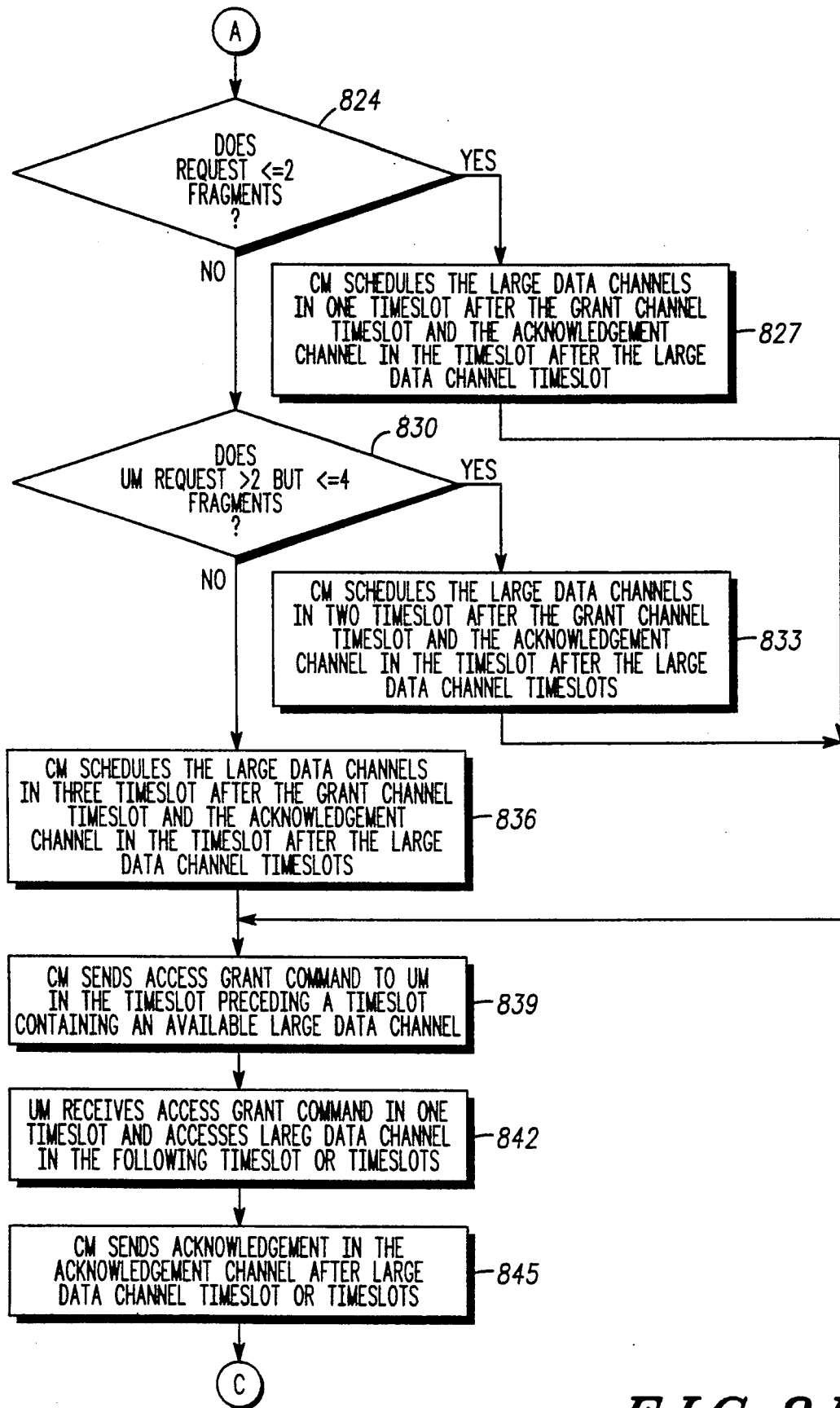

FIG. 8 illustrates, in block diagram form, the method of scheduling in accordance with the invention. The scheduling process starts when the CM 105 receives at 800 access request commands from the UMs 101–103 and the EM 104. The CM 105 then queues at 803 large data channel 420 access request commands and small data channel 415 access request commands in separate queues on a FIFO basis. A test is then performed at 806 to determine if a request exists on the large data channel 420 queue. If a request exists, processing of the large data channel 420 begins at block 824 (discussed below). If a request does not exist, a test is performed at 809 to determine if a request exists on the small data channel 415 request queue. Again, if a request exists, processing of the large data channel 420 begins at block 824 (discussed below). If a request does not exist, then neither a large data channel request or a small data channel existed, and the process will go at 848 to the next timeslot. If either of the tests at 806 and 809 indicate a request is present, the CM 105 performs a test at 824 to determine if the UM requested less than or equal to 2 fragments 305. If it did, the CM 105 schedules at 827 the large data channel 420 in one timeslot after grant channel timeslot and the acknowledgement channel 425 in the timeslot after the large data channel 420 timeslot. If the UM requested more than two fragments 305, the CM 105 performs at 830 a test to determine if the UM requested greater than two but less than or equal to four fragments 305. If it did, the CM 105 schedules at 833 the large data channel 420 in two timeslots after the grant channel timeslot and the acknowledgement channel 425 in the timeslot after the two large data channel 420 timeslots. If the UM requested greater than four fragments 305, the CM 105 schedules at 836 the large data channel 420 in three timeslots after the grant channel timeslot and the acknowledgement channel 425 in the timeslot after the three large data channel 420 timeslots. The CM 105 then sends at 839 an access grant command to the UM in the timeslot preceding a timeslot containing an available large data channel 420, where the UM receives at 842 the access grant command in one timeslot and accesses the large data channel 420 in the corresponding number of following timeslots. The CM 105 then sends at 845 an acknowledgement in the ACK channel 425 of the timeslot following the large data channel 420 timeslot or timeslots.

After the CM 105 sends at 845 an acknowledgement, a test is then performed to determine if another request exists on the small data channel 415 queue. If a request does not exist, the process will go at 848 to the next timeslot. If a request does exist on the small data channel 415 queue, the CM 105 schedules at 812 the next available grant channel 410, small data channel 415 in the timeslot after the grant channel timeslot and the acknowledgement channel 425 in the timeslot after the small data channel 415 timeslot. The CM then sends at 815 an access grant command to the UM in the scheduled grant channel, which receives at 818 the access grant command in one timeslot and accesses the small data channel 415 in the following timeslot. The CM 105 then sends at 821 an acknowledgement in the ACK channel 425 in the timeslot after the small data channel 415 timeslot and goes at 848 to the next timeslot.

Significant to the system is the fact, although the examples illustrate scheduling of the small data channel and large data channel separately, the CM 105 can receive up to twelve requests per RF TDM frame 400, the grant timeslot 410 is subdivided into a small data channel grant and a large data channel grant and the ACK channel 425 is subdivided into a small ACK channel and a large ACK channel. This means that, depending on the size of the Ethernet packet 300, scheduling of the small data channel 415, large data channel 420 and the ACK channel 425 can occur independently but can still use a common RF TDM frame 400.

Also significant to the system is that the scheduling is done on a frame-by-frame basis. This allows the system to actual build a "template" containing information as to how the small, large and ACK channel (415, 420, 425) are scheduled in a particular timeslot or frame. The "template" serves as a tool to program the particular timeslot with the scheduled information at a particular time, e.g. at the start of each timeslot. This frame-by-frame scheduling flexibility allows look-ahead scheduling in the system as well. In the preferred embodiment, up to four timeslots can be pre-scheduled at any one time. Look-ahead scheduling is possible since the CM 105 is constantly keeping track of all incoming requests which contain the necessary number of fragments for data transmission. The combination of frame-by-frame scheduling and look-ahead scheduling reduce processing time since the system, at the beginning of each timeslot, knows what data to program the channels with. The combination also makes efficient use of the channels allocated in a timeslot.

What is claimed is:

1. A control module which schedules access to a plurality of data channels in a radio frequency (RF) time-division multiple access (TDMA) communication system coupled to a plurality of user modules over a RF link, at least first and second user modules having sent a first and second access request command, respectively, to the control module to request access to at least one data channel, the control module comprising:
   means for providing repetitive TDM frames including at least a first TDM frame having at least one data channel;
   means, coupled to said means for providing, for receiving at least said first and second access request command in at least said first TDM frame;
   means, coupled to said means for receiving, for determining which of at least said first access request command and second access request command said means for receiving received first; and
   means, coupled to said means for providing repetitive TDM frames and responsive to said means for determining, for scheduling access to said at least one data channel in at least said first TDM frame.

2. The control module of claim 1 wherein the control module further comprises means for linking to a plurality of external modules.

3. The control module of claim 2 wherein at least one of said plurality of external modules further comprises means for sending an access request command to request access to said at least one data channel.

4. The control module of claim 1 wherein said means for providing further comprises means for providing repetitive TDM frames including at least a first TDM frame having a plurality of grant channels for granting said scheduled access.

5. The control module of claim 4 wherein said means for scheduling further comprises means for scheduling access to at least one of said grant channels.

6. The control module of claim 1 wherein said means for providing further comprises means for providing repetitive TDM frames including at least a first TDM frame having a plurality of acknowledgement channels for acknowledging an access request command.

7. The control module of claim 6 wherein said means for scheduling further comprises means for scheduling access to at least one of said acknowledgement channels.

8. The control module of claim 1 wherein said means for scheduling further comprises means for determining how many of said data channels said means for scheduling schedules.

9. A radio frequency (RF) time-division multiple access (TDMA) communication system employing a plurality of user modules and a control module to schedule access to a plurality of data channels, the RF TDMA communication system comprising:
 means for providing repetitive TDM frames including at least a first TDM frame;
 means for providing at least one data channel disposed in at least said first TDM frame;
 means for providing an access request command;
 means, at least one user module, for sending said access request command during at least said first TDM frame;
 means, at the control module, for receiving said access request command from said at least one user module; and
 means, coupled to said means for receiving, for scheduling access to said at least one data channel in at least said first TDM frame in response to said receipt of said access request command.

10. The RF TDMA communication system of claim 9 further comprising means for providing a plurality of grant channels for granting said scheduled access disposed in at least said first TDM frame.

11. The RF TDMA communication system of claim 10 wherein said means for scheduling further comprises means for scheduling access to at least one of said grant channels.

12. The RF TDMA communication system of claim 9 further comprising means for providing a plurality of acknowledgement channels for acknowledging an access request command disposed in at least said first TDM frame.

13. The RF TDMA communication system of claim 12 wherein said means for scheduling further comprises means for scheduling access to at least one of said acknowledgement channels.

14. The RF TDMA communication system of claim 9 wherein said means for scheduling further comprises means for determining how many of said data channels said means for scheduling schedules.

15. The RF TDMA communication system of claim 9 wherein said means for receiving further comprises means for queueing at least one of said access request commands on a first in/first out (FIFO) basis.

16. A method of scheduling access to a plurality of data channels in a control module incorporated in a radio frequency (RF) time-division multiple access (TDMA) communication system, the control module coupled to a plurality of user modules over a RF link, at least first and second user modules having sent a first and second access request command, respectively, to the control module to request access to at least one data channel, the method of scheduling comprising the steps of:
 providing repetitive TDM frames including at least a first TDM frame;
 providing at least one data channel disposed in at least said first TDM frame;
 receiving at least said first and second access request command in at least said first TDM frame;
 determining which of at least said first access request command and second access request command said means for receiving received first; and
 scheduling, responsive to said step of determining, access to said at least one data channel in at least said first TDM frame.

17. The method of claim 16 further comprising the step linking to a plurality of external modules.

18. The method of claim 17 further comprising the step of sending an access request command from at least one of said plurality of external modules to request access to said at least one data channel.

19. The method of claim 16 further comprising the step of providing a plurality of grant channels grant channels for granting said scheduled access disposed in at least said first TDM frame.

20. The method of claim 19 wherein said step of scheduling further comprises the step of scheduling access to at least one of said grant channels.

21. The method of claim 16 further comprising the step of providing a plurality of acknowledgement channels for acknowledging an access request command disposed in at least said first TDM frame.

22. The method of claim 21 wherein said step of scheduling further comprises the step of scheduling access to at least one of said acknowledgement channels.

23. The method of claim 16 wherein said step of scheduling further comprises the step of determining how many of said data channels said means for scheduling schedules.

24. A method of scheduling in a radio frequency (RF) time-division multiple access (TDMA) communication system employing a plurality of user modules and a control module linked to a plurality of external modules, the user modules coupled to the control module via a RF link, the method comprising the steps of:
 providing repetitive TDM frames including at least a first TDM frame;
 providing at least one data channel disposed in said at least a first TDM frame;
 providing an access request command;
 sending, at at least one user module, said access request command during at least said first TDM frame;
 receiving, at the control module, said access request command from said at least one user module; and
 scheduling access to said at least one data channel in at least said first TDM frame in response to receipt of said access request command.

25. The method of claim 24 further comprising the step of providing a plurality of grant channels grant channels for granting said scheduled access disposed in at least said first TDM frame.

26. The method of claim 25 wherein said step of scheduling further comprises the step of scheduling access to at least one of said grant channels.

27. The method of claim 24 further comprising the of providing a plurality of acknowledgement channels for acknowledging an access request command disposed in at least said first TDM frame.

28. The method of claim 27 wherein said step of scheduling further comprises the step of scheduling access to at least one of said acknowledgement channels.

29. The method of claim 24 wherein said step of scheduling further comprises the step of determining how many of said data channels said means for scheduling schedules.

30. The method of claim 24 wherein said step of receiving further comprises the step of queueing at least one of said access request commands on a first in/first out (FIFO) basis.

31. A radio frequency (RF) time-division multiple access (TDMA) communication system employing a plurality of user modules and a control module to schedule access to a plurality of data channels, the RF TDMA communication system comprising:
    means for providing repetitive TDM frames including a first TDM frame;
    means for providing a first data channel and a second data channel disposed in said first TDM frame;
    means, at a first user module, for providing at least first and second access request commands for requesting access to said first and second data channels, respectively;
    means, at said first user module, for determining which of said first and second data channels is to be accessed;
    means, from said first user module and responsive to said means for determining, for sending one of said first and second access request commands during said first TDM frame;
    means, at the control module, for receiving said sent access request command from said first user module; and
    means, coupled to said means for receiving, for scheduling access to one of said first and second data channels in at least one of said repetitive TDM frames in response to said receipt of said sent access request command.

32. The RF TDMA communication system of claim 31 further comprising means, at the user and control modules, for transforming a packet of data from a first protocol to a fragment of data in a second protocol and transforming a fragment of data from said second protocol to a packet of data in said first protocol.

33. The RF TDMA communication system of claim 32 wherein said first protocol is an ETHERNET local area network (LAN).

34. The RF TDMA communication system of claim 32 wherein said first data channel has a bandwidth for transmitting a single fragment and said second data channel has a bandwidth for transmitting a plurality of fragments.

35. The RF TDMA communication system of claim 34 wherein said means for determining further comprises means for determining which of said first and second data channels are assigned for transmission of said packet of data based upon a size of a data within said packet of data.

36. A method of scheduling in a radio frequency (RF) time-division multiple access (TDMA) communication system employing a plurality of user modules and a control module linked to a plurality of external modules, the method comprising the steps of:
    providing repetitive TDM frames including a first TDM frame;
    providing a first data channel and a second data channel disposed in said first TDM frame;
    providing, at a first user module, at least first and second access request commands for requesting access to said first and second data channels, respectively;
    determining, at said first user module, which of said first and second data channels is to be accessed;
    sending, from said first user module and responsive to said step of determining, one of said first and second access request commands during said first TDM frame;
    receiving, at the control module, said sent access request command from said first user module; and
    scheduling access to one of said first and second data channels in at least one of said repetitive TDM frames in response to said receipt of said sent access request command.

37. The method of claim 36 further comprising the step, at the user and control modules, of transforming a packet of data from a first protocol to a fragment of data in a second protocol and transforming a fragment of data from said second protocol to a packet of data in said first protocol, wherein said first protocol is an ETHERNET local area network (LAN).

38. The method of claim 37 wherein said first data channel has a bandwidth for transmitting a single fragment and said second data channel has a bandwidth for transmitting a plurality of fragments and wherein said step of determining further comprises the step of determining which of said at least first and second data channels are assigned for transmission of said packet of data based upon a size of a data within said packet of data.

* * * * *